United States Patent [19]
Steinfort

[11] Patent Number: 5,842,443
[45] Date of Patent: Dec. 1, 1998

[54] ANIMAL LIFTING MEANS

[76] Inventor: John James Steinfort, P.O. Box 329. 3 Peters Street, Mirboo North, VIC 3871, Australia

[21] Appl. No.: 913,052
[22] PCT Filed: Mar. 12, 1996
[86] PCT No.: PCT/AU96/00134
§ 371 Date: Sep. 5, 1997
§ 102(e) Date: Sep. 5, 1997
[87] PCT Pub. No.: WO96/28017
PCT Pub. Date: Sep. 19, 1996

[30] Foreign Application Priority Data

Mar. 9, 1995 [AU] Australia .................................. PN1604

[51] Int. Cl.$^6$ ....................................................... A61D 3/00
[52] U.S. Cl. ............................................................... 119/726
[58] Field of Search ............................. 119/722–726, 728

[56] References Cited

U.S. PATENT DOCUMENTS

| 4,432,306 | 2/1984 | Rossa | 119/725 |
| 4,489,677 | 12/1984 | Handley | 119/725 |
| 4,556,016 | 12/1985 | Snell et al. | 119/725 |
| 5,090,368 | 2/1992 | Berghoefer | 119/96 |
| 5,469,812 | 11/1995 | Burks | 119/728 |

Primary Examiner—Thomas Price
Attorney, Agent, or Firm—Sterne, Kessler, Goldstein & Fox P.L.L.C.

[57] ABSTRACT

An animal lifting apparatus comprising a frame including longitudinal members, forward strut, rear strut on which is mounted a hindquarter support, a harness support attached to frame gambrel being connected to a frame by straps, received by slots in outriggers extending from the spine of gambrel, and the gambrel being connectable to a weight lifting device via a chain passing through an eye.

21 Claims, 3 Drawing Sheets

ANIMAL LIFTING MEANS

This invention relates to apparatus used in lifting of animals that are ill and in particular to apparatus for lifting quadruped animals that are "down" or intermittently recumbent or "cast" or recovering from anaesthesia or veterinary surgery or undergoing rehabilitation.

Animals which are recumbent due to illness or musculoskeletal problems have to be raised to prevent further deterioration in their condition due to them continuing to remain recumbent. Two currently used methods of raising or lifting recumbent animals, particularly cattle, involve the use of either hip clamps or a sling.

In the former case a large clamp is positioned over the protruding ilia of the animal's hip. The jaws of the clamp are then tightened to compress onto the gluteal hip muscles surrounding the ilia. This contact provides lift points for a front end loader or a block and tackle mechanism to lift the rear end of the cow. Often a cow will stand unaided when the hind quarters have been lifted in this manner. However, a lot of muscle and skin damage occurs at the clamp contact points because of the high weight per unit area load. Cows that have been lifted in this manner on more than two occasions generally suffer very severe soft tissue damage around the hip to such an extent that they have to be destroyed because of this complication and failure to recover from the initial complaint.

Slings are satisfactory in some instances in enabling cows to be lifted. One form of sling is described in Australian patent No. 540088, which discloses a simple sling in combination with a mobile pen. However, slings have fallen out of favour because of the length of time required, and the degree of difficulty, in setting the sling on the cow. Furthermore many cows were unable to stand due to the lack of support of their hind limbs.

It is an object of the present invention to provide means which substantially lessen the above-mentioned problems, and enables animals to stand by providing more adequate and non-traumatic support.

DESCRIPTION OF THE INVENTION

According to one aspect of the present invention there is provided an animal lifting means including a frame to which at least one weight bearing means is attachable, and to which weight lifting device connection means are also attachable, said frame conforming generally with the lower part of said animal's body and extending beyond and between the front legs and the hind legs of said animal.

Preferably the frame includes a plurality of longitudinal members portions of which extend (or "tuck up") between the front legs and brisket. In the case of cows and other ruminant animals portions of the frame pass on either side of the udder. Preferably the length and/or width of the frame is alterable to permit a more advantageous fit for the particular animal to be lifted. More preferably, if the frame is suitably shaped only the length need be alterable. The frame advantageously may be constructed of metal, e.g. iron tubing or piping, but other suitable materials, including reinforced plastics or fibreglass, may be used. Those portions of the frame which contact the animal to be lifted may be padded to reduce pressure on the body of the animal.

The weight bearing means (hereinafter called "supporting harness") preferably comprises at least one band of material, preferably of textile, capable of supporting the weight of the animal, the width of the band or bands measured in the direction of the general longitudinal axis of the frame being such that a suitably low load in terms of weight per unit area can be achieved, thereby diminishing the likelihood of trauma such as pressure sores. Preferably said at least one band is provided with means for adjusting its width measured in the direction transverse the general longitudinal axis of the frame to permit a more advantageous fit for the particular animal to be lifted and so that the weight of the animal is substantially evenly distributed along the lifting means. Preferably the said at least one band is also capable of being so dimensioned as to enable an animal to be lifted and supported in a balanced way.

In a preferment, the frame or "animal stretcher" may be provided with a supporting harness extending from forward of the middle of the frame to midway along the frame, thereby giving support to brisket, chest and parts of the abdomen of a supported animal during lifting and subsequent support. Preferably, the supporting harness comprises a single band of textile material provided with means for adjusting its width measured in the direction transverse the general longitudinal axis of the frame. Such a one piece supporting harness may be attached to the frame by folding lateral edges of the band around longitudinal members of the frame and linking the free lateral edges beneath the frame by means of Velcro patches on those lateral edges and/or on straps attached thereto. This form of supporting harness may be provided with apertures to accommodate a chest strap for the animal. The supporting harness may also be provided with straps to enable it to better accommodate an animal.

Hindquarter support means such as a seat or saddle may be mounted to the rear portion of the frame to support the hindquarters and/or rear legs of an animal being lifted. The hindquarter support means may be mounted on the frame prior to lifting of the animal to take part of the weight of the animal during lifting. Such hindquarter support means may be adjustable in height and/or in position along the frame. The hindquarter support means make take the form of a seat designed to support the pelvis and, for ruminant animals, it is preferably positioned behind the udder in female animals and the scrotum in male animals.

The frame may be strapped to the animal's body or, more preferably, positioned against the animal's undercarriage by adjustment of the width of the weight bearing means by adjustment means, preferably, a plurality of straps. Other straps, cables or chains may be connected to the frame and to a gambrel for connection to a crane or other lifting device. Once fitted to the animal and connected to the gambrel the lifting means can be raised by operating a connected lifting device thereby lifting the animal comfortably and atraumatically.

The gambrel may be constructed from conventional materials such as steel piping, steel plate or rolled section, reinforced plastics or fibreglass according to desired weight bearing requirements. Preferably it includes a plurality of laterally extending outriggers disposed along a cental member or spine, with means for receiving means connecting gambrel to frame being disposed towards outer end of the outriggers.

In use the adjustable frame is inserted under the body of an animal that has gone down with the end portions projecting between its limbs, the animal first having been rolled on its side and lifted or pushed into a semi-recumbent position. A seat is then mounted adjacent the rear end of the frame for support of the hindquarters. The frame is then adjusted to conform better with the animal's shape. A support harness is then attached to the frame and adjusted to generally conform with the lower body of the animal.

Alternatively, the sear and supporting harness may be mounted or attached to frame prior to placement of the frame under the animal. Chains, straps or ropes are then used to connect the frame and the gambrel. Those chains, straps or ropes may have been attached to the frame prior to placement under the animal. The gambrel is then connected via a chain to a weight lifting device such as a crane or hydraulically-operated lifting jib on a tractor. The weight lifting means is then operated to raise the entire apparatus and the animal.

The lifting means may also be used to support animals during rehabilitation from partial paralysis or recovery from anaesthesia. The partially paralysed animal can be partly supported enabling it to stand and exercise its limbs without those limbs having to support the full weight of the animal.

Support means, preferably skis, skids, or wheels, may be mounted on the frame to permit an animal being supported by the frame to provide the animal with limited mobility and enable it to remain standing or partly standing or to walk for extended periods. This significantly assists in rehabilitation of the animal.

Lifting means according to the present invention may be used in conjunction with an alternative form of support means in the form of a movable cage capable of at least partially enclosing the animal and capable of supporting the weight of the animal and lifting means. Preferably said cage may be mounted on wheels and can be positioned over an animal prior to lifting. More preferably said cage may also be provided with a lifting device such as a winch and cable connectable to said lifting means via a gambrel. The cage may be constructed from conventional materials and, preferably, is readily disassembled for transport.

Other adaptations to provide mobility to the supported animal may also be employed.

A modified version of the invention may be used with horses, for example, during post-anaesthesia recovery especially after surgery to repair fractured bones. There is a high level of surgical failure in equine orthopaedics due to poor recovery from anaesthics. Also, if the animal puts too much weight on the surgically repaired leg it will break down leading to the need to destroy the horse.

The basic concept of the frame supporting the lower torso from brisket to hindquarters is preserved. Because of the distinct anatomical differences between equine animals and ruminant animals, the hindquarter support means should be quite different that employed for bovine animals. For horses, the shape of the frame should approximate that of the contours of the horse's lower torso, the brisket section thereof being appreciably narrower than that of a bovine animal. The frame should then extend laterally once past the collar area and spread out to support, with the aid of attached support harness, the chest. The frame should also extend rearwardly to the lower abdomen of the horse. Means to support the hindquarters may be used in conjunction with the frame to provide sufficient and atraumatic support for a horse when it is trying to stand and also while it is standing and recovering from a general anaesthetic, surgery, orthopaedic surgery, or an ailment causing lameness.

A lifting mechanism is required to raise the gambrel and animal. The horse may be raised in one lift or in multiple stages, with the forequarters being raised to the desired height first, then the hindquarters being raised, with adjustments being made thereafter to allow weight to be borne evenly. The multiple stage method resembles the natural way in which horses rise to stand, ie, with front leg extension coupled with partial lift followed by hind-leg lift and then normal stance. Once standing, the horse can then be fully lifted and transported or partially lifted to give support in cases of lameness, leg fracture, or post-anaesthetise recovery.

An object of the lifting means is to provide support to the brisket, chest, abdomen and hindquarters or hind limbs when lifting or standing. The lifting means is designed to bear a proportion of the animal's weight when standing so that the animal can bear some of its own weight. In some circumstances, some animals may not be able to bear much or any weight. This can happen but it generally indicates a severe condition or problem.

The animal lifting means can also be used to provide a means of transporting injured, ill, or recumbent animals. Because of the even support, animals can be comfortably lifted fully off the ground and transported in that state to a hospital, stall, barn or easily-accessed paddock. Stabilising bars can be used to inhibit the animal from swaying or lurching as uneven ground is traversed. These bars may be connected to the frame at appropriate points (depending upon the particular situation) and to appropriate points on the lifting and transport means, e.g., a front-end loader or tractor.

DESCRIPTION OF A PREFERRED EMBODIMENT

In order that the invention may be more clearly understood, reference is made to a non-limiting preferred embodiment as schematically depicted in the accompanying drawings in which:

FIG. 4 is a diagrammatic illustration of the embodiment of FIG. 1 in use; and FIG. 5 is a diagrammatic rear end view of the embodiment of FIG. 1 in use.

Figure 1:
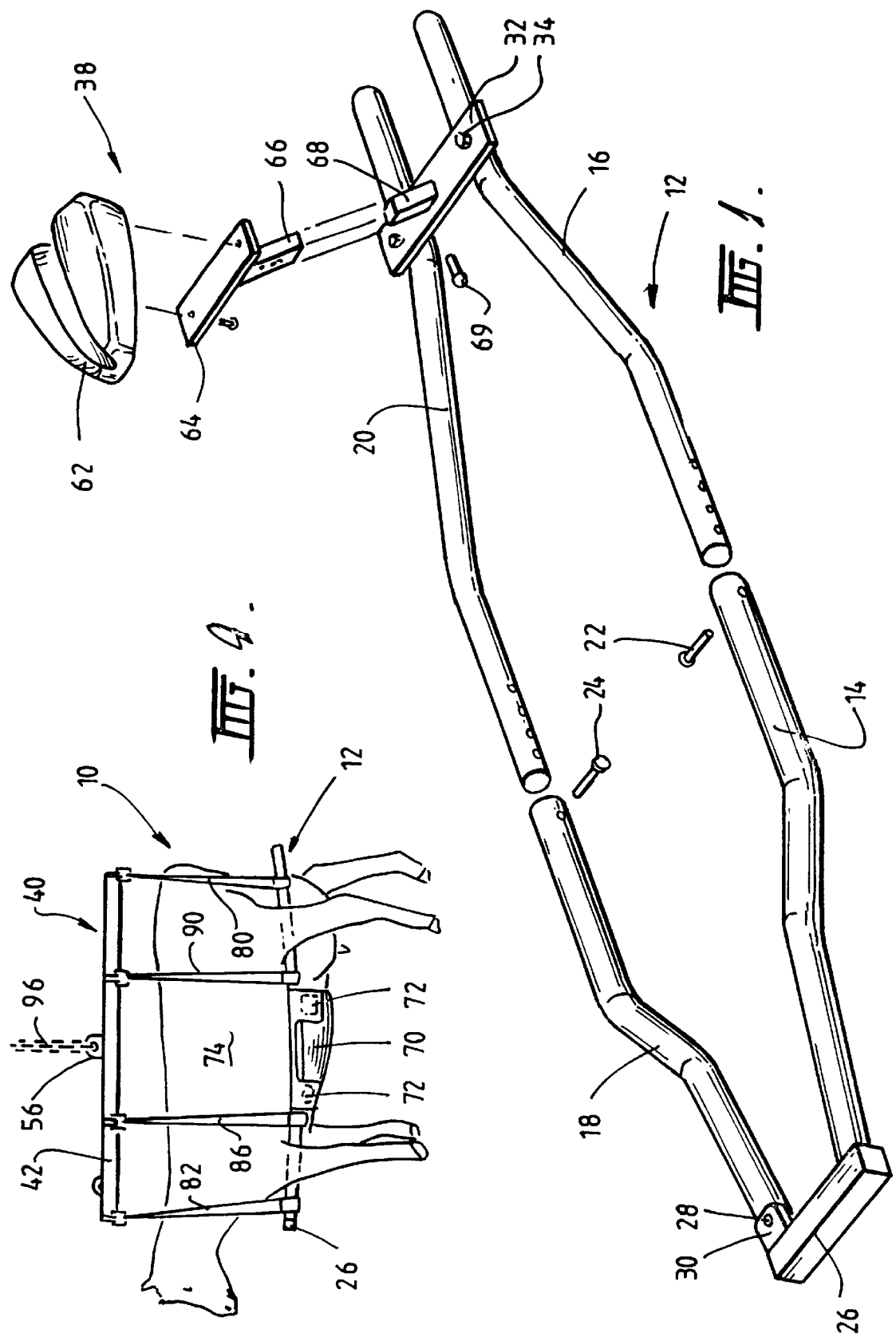
FIG. 1 is a perspective view from the front of a frame for lifting cows.
Figure 2:
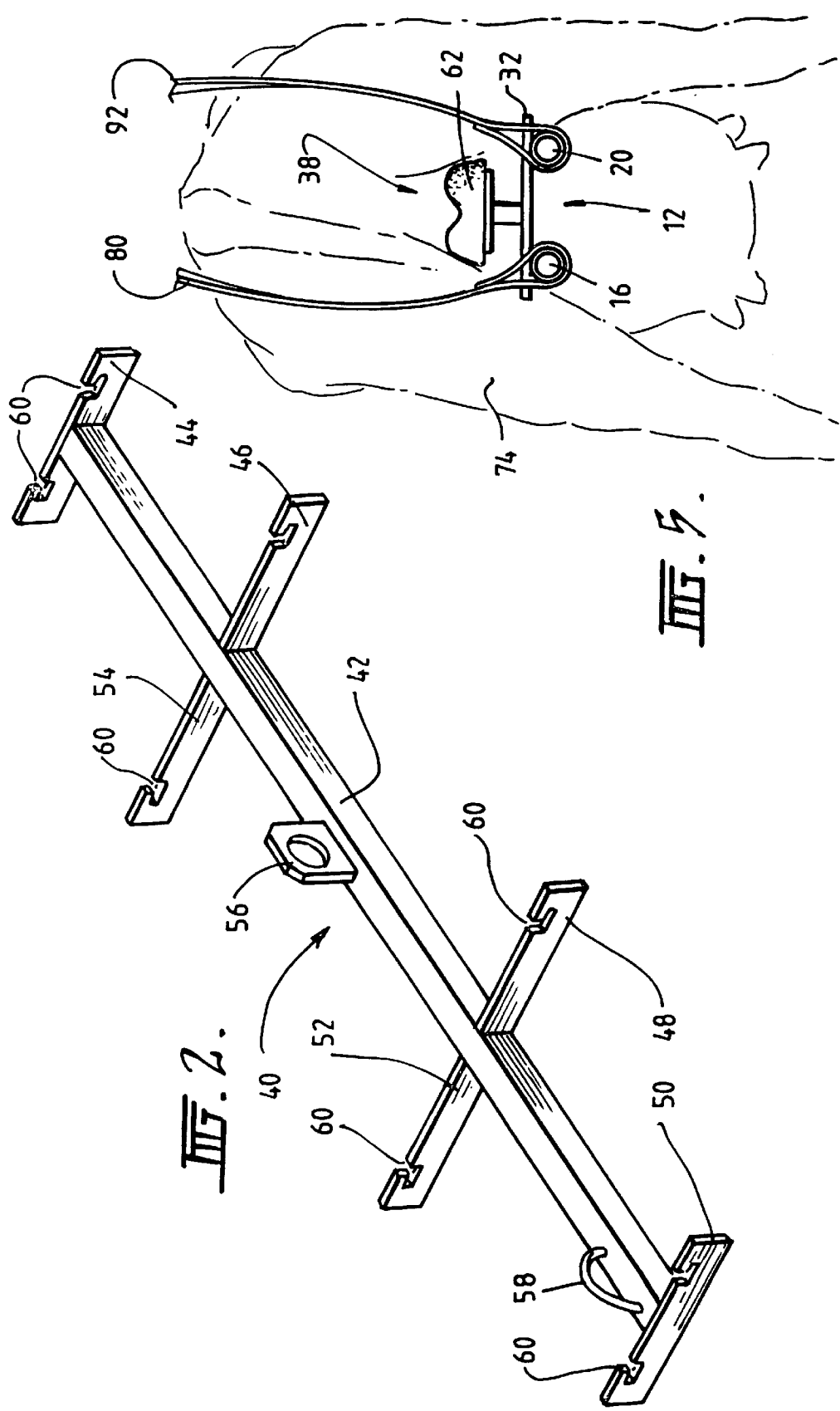
FIG. 2 is a perspective view of a gambrel that may be used in conjunction with the frame of FIG. 1.
Figure 3:
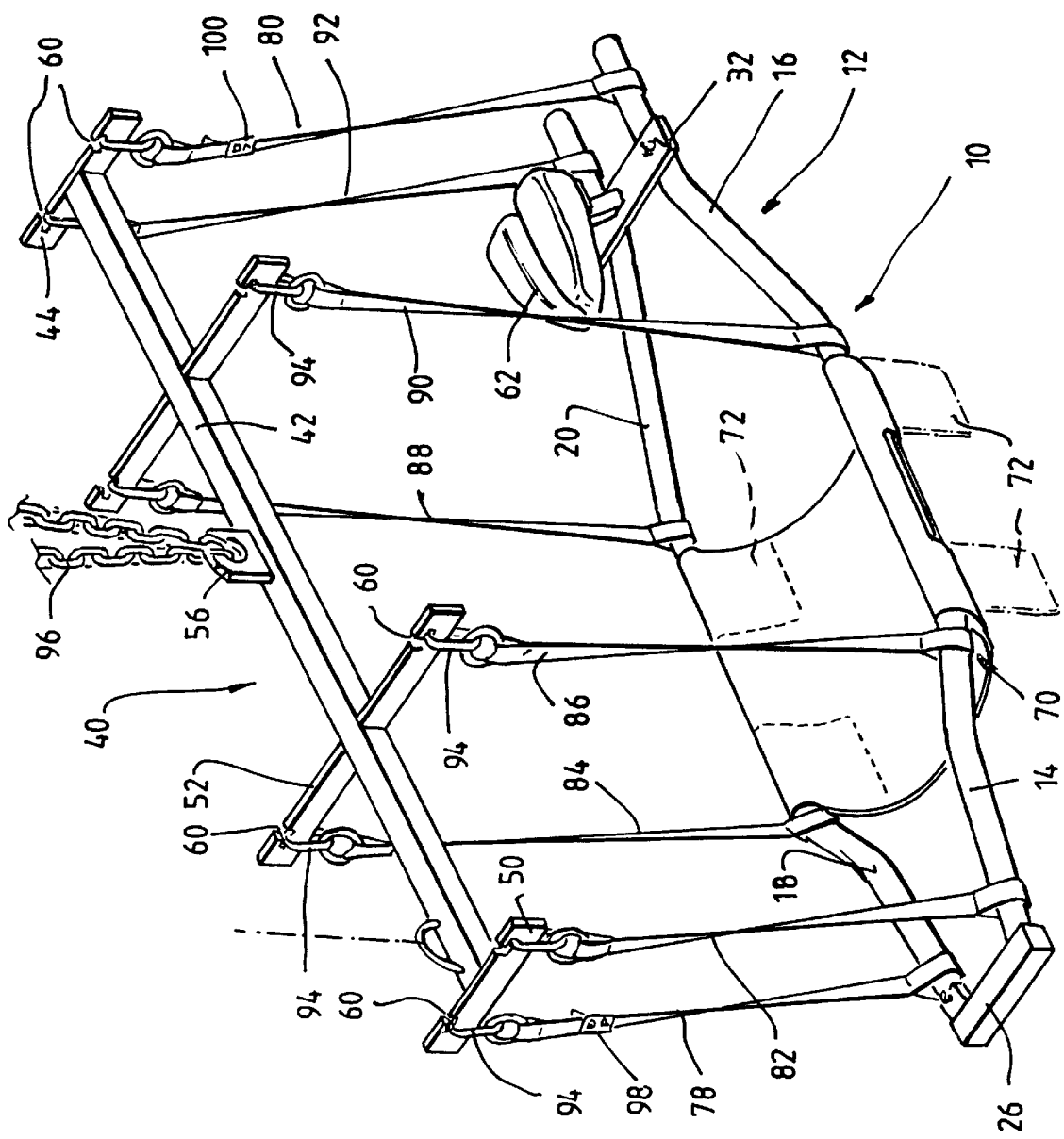
FIG. 3 is a perspective view of an assembled animal lifting means incorporating the frame shown in FIG. 1.

The lifting means, indicated generally by the numeral 10, is for lifting large ruminant animals, specifically cattle. It comprises adjustable frame 12 constructed from lengths of galvanised iron tubing or piping (hereinafter, for convenience, called "piping"), 14, 16, 18, and 20. Fore nearside piping 14 and fore offside piping 18 are telescopically received in foremost end of aft nearside piping 16 and aft offside piping 20, respectively, and retained in position by pins 22 and 24 passing through registering through holes in the pipings, there being a plurality of through holes towards the rear of the fore pipings. This permits adjustment of the length of the frame. Alternatively, the foremost ends of the aft pipings may be telescopically received in the aftmost ends of the fore pipings (not shown here). Thumbscrews (here not shown) may be used as another means of relatively securing the lengths of piping. The lengths are bent so as to generally confirm with the lower body of a cow. A strut 26 is welded to the forward end of fore nearside piping 14 and is pivotally connected to the forward end of fore offside piping 18 by a pin 28 passing through registering holes in flanges 30 and adjacent the forward end of fore offside piping 18. In another embodiment (not shown here) strut 26 is welded to both forward ends of the fore pipings. A rear strut 32 is attached by threaded bolts 34 and nuts to rearward portions of the aft pipings. Alternatively rear strut 32 may be welded to rearward portions of the aft pipings. A "seat" or support means, indicated generally by numeral 38, is mounted on the rear strut in a manner later disclosed. In this embodiment the struts are not adjustable. However, it is possible to have struts which can be adjusted to accommodate animals of differing body shapes.

The gambrel, indicated generally by the numeral 40, comprises a spine 42 of rectangular cross-section steel, a plurality of outriggers 44, 46, 48, 50, 52, and 54, all of steel plate, and eyes 56 and 58. Each outrigger is provided with a slot or slots 60 to receive clips, hooks, snap links or the like attached to ends of straps, belts or cables connecting the frame to the gambrel. Main eye 56 is constructed from steel plate and is for receipt of a chain connectable to a weight lifting means such as a hydraulically-operated jib mounted on a tractor. Fore eye 58 is provided to enable adjustment of the orientation of a lifted animal so that it is supported in a comfortable manner, by use of a second chain or cable. The provision of loops at the outer ends of the outriggers results in less pressure being exerted on the body of the animal being lifted by ropes, cables, straps or chains linking the gambrel and the frame. This leads to a lower likelihood of injury to the ribs or spine of the animal during lifting.

"Seat" 38 comprises a weight-supporting portion 62 mounted on a plate 64 which in turn is mounted on female stem 66 which is telescopically mountable on a forwardly extending male projection 68 on rear strut 32. The seat is grooved and tapers toward the front. An object of the seat is to give support to the animal being lifted by taking weight from below the pelvis as indicated in FIG. 5. This lessens the amount of weight to be borne by the inguinal/groin area of the animal. The animal is then more comfortable while being lifted. The height of the seat may be adjusted by use of a bolt or pin 69 insertable through registering hole in female stem 66 and male projection 68.

A one piece supporting harness or sling 70 is attached to the frame by folding the lateral extensions 72 of the supporting harness around piping lengths 14, 16, 18 and 20 and linking the lateral extensions to the supporting harness underneath the frame by means of Velcro patches provided on those lateral extensions and the underneath of the supporting harness and/or on straps attached thereto. This supporting harness, comprising a suitable textile material, may be provided with holes or apertures (not shown here) to accommodate a chest strap for the animal. The supporting harness may also be provided with straps (not shown) to enable it to be better fitted to an animal.

In use the adjustable frame 10 with supporting harness 70 and "seat" 38 fitted is inserted under the body of an animal 74 that has gone down with the end portions of the frame projecting between its limbs, the animal first having been rolled on its side and lifted or pushed into a semi-recumbent position. The frame may then be adjusted to conform better with the animal's shape. Adjustable straps 78 and 80 and non-adjustable straps 82, 84, 86, 88, 90, and 92, already attached to the lengths of piping, are then connected to the gambrel 40 by loops or links 94 received in slots 60. The gambrel 40 is then connected via a chain 96 passing through eye 56 to a weight lifting device such as a crane or hydraulically-operated jib on a tractor (not shown). The weight lifting device is then operated to raise the entire apparatus and the animal as shown in FIG. 4.

When a lifted animal eventually is able to stand unaided, the weight lifting device is operated to lower gambrel 40 and the frame is released by first tightening adjustable straps 78 and 80 using adjusting means 98 and 100, which draws the frame closer to the body of the animal and enables easy release of the non-adjustable straps, then the adjustable straps are loosened and then released, as a result of which the frame falls to the ground. The animal can then walk off.

The frame may also be provided with loops (not shown) for the attachment of straps, chains, cables or ropes. Additionally, portions of the frame may be padded to reduce pressure on the body of the animal at points of contact.

It is believed that the invention and many of its attendant advantages will be understood from the foregoing description and it will be apparent that various changes may be made in the form, construction and arrangement of the parts and that changes may be made in the form, construction and arrangement of the animal lifting means described without departing from the scope and spirit of the invention or sacrificing all of its material advantages, the forms hereinbefore described being merely preferred embodiments hereof.

I claim:

1. An animal lifting means including a frame to which at least one weight bearing means is attachable, and to which weight lifting device connection means are also attachable, said frame conforming generally with the lower part of the body of the animal to be lifted and extending beyond and between the front legs and the hind legs of said animal wherein the weight bearing means comprises a supporting harness attachable to the frame and extending from forward of the middle of the frame to midway along the frame.

2. An animal lifting means as claimed in claim 1 wherein said supporting harness comprises a single band of textile material provided with means for adjusting its width measured in the direction transverse the general longitudinal axis of the frame.

3. An animal lifting means as claimed in claim 1 wherein the frame includes a plurality of longitudinal members portions of which extend between the front legs and brisket of said animal.

4. An animal lifting means as claimed in claim 1 wherein the frame includes a plurality of longitudinal members the lengths of which are alterable to permit a more advantageous fit for said animal to be lifted.

5. An animal lifting means as claimed in claim 1 wherein the width of the frame is alterable to permit a more advantageous fit for said animal to be lifted.

6. An animal lifting means as claimed in claim 1 wherein the weight bearing means comprise at least one band of material attachable to said frame and capable of supporting the weight of said animal.

7. An animal lifting means as claimed in claim 6 wherein the width of the band or bands measured in the direction of the general longitudinal axis of the frame is such that a satisfactorily low load in terms of weight per unit area is achieved.

8. An animal lifting means as claimed in claim 6 wherein the said at least one band is provided with means for adjusting width.

9. An animal lifting means including a frame to which at least one weight bearing means is attachable, and to which weight lifting device connection means are also attachable, said frame conforming generally with the lower part of the body of the animal to be lifted and extending beyond and between the front legs and the hind legs of said animal wherein a support means is mounted to the rear portion of the frame to support the hindquarters and/or rear legs of said animal.

10. An animal lifting means as claimed in claim 9 wherein said support means is height adjustable.

11. An animal lifting means as claimed in claim 9 wherein the position of said support means is adjustable relative to the general longitudinal axis of the frame.

12. An animal lifting means as claimed in claim 9 wherein said support means comprises a pelvis-supporting seat.

13. An animal lifting means as claimed in claim 10 wherein said support means is locatable behind the udder in female ruminant animals.

14. An animal lifting means as claimed in claim 10 wherein said support means is locatable behind the scrotum in male ruminant animals.

15. An animal lifting means including a frame to which at least one weight bearing means is attachable, and to which weight lifting device connection means are also attachable, said frame conforming generally with the lower part of the body of the animal to be lifted and extending beyond and between the front legs and the hind legs of said animal wherein the frame is strapped to the animal's body with a plurality of bands or straps.

16. An animal lifting means including a frame to which at least one weight bearing means is attachable, and to which weight lifting device connection means are also attachable, said frame conforming generally with the lower part of the body of the animal to be lifted and extending beyond and between the front legs and the hind legs of said animal wherein the frame is connectable to a gambrel for connection to a crane or other lifting device.

17. An animal lifting means as claimed in claim 16 wherein said gambrel includes a spine from which extend laterally a plurality of members for connection to the frame via connection means.

18. An animal lifting means as claimed in claim 17 wherein means for receiving means connecting gambrel to said frame are disposed towards outer ends of said outriggers.

19. An animal lifting means as claimed in claim 16 wherein said gambrel is connected to said frame by a plurality of chains, belts or straps.

20. An animal lifting means as claimed in claim 19 wherein the length at least one of said plurality of chains, belts or straps is adjustable.

21. An animal lifting means as claimed in claim 16 wherein said gambrel is connected to a lifting device by at least one chain or cable.

* * * * *